(12) United States Patent
Han et al.

(10) Patent No.: US 11,569,945 B2
(45) Date of Patent: Jan. 31, 2023

(54) RELIABLE INFORMATION TRANSMISSION METHOD AND APPARATUS

(71) Applicant: ZTE Corporation, Guangdong (CN)

(72) Inventors: Xianghui Han, Guangdong (CN); Shuqiang Xia, Guangdong (CN); Jing Shi, Guangdong (CN); Chunli Liang, Guangdong (CN); Min Ren, Guangdong (CN); Wei Lin, Guangdong (CN)

(73) Assignee: ZTE Corporation, Shenzhen (CN)

( * ) Notice: Subject to any disclaimer, the term of this patent is extended or adjusted under 35 U.S.C. 154(b) by 177 days.

(21) Appl. No.: 16/986,055

(22) Filed: Aug. 5, 2020

(65) Prior Publication Data
US 2020/0366426 A1   Nov. 19, 2020

Related U.S. Application Data

(63) Continuation of application No. PCT/CN2018/076710, filed on Feb. 13, 2018.

(51) Int. Cl.
 *H04L 1/18* (2006.01)
 *H04W 72/12* (2009.01)
 *H04L 5/00* (2006.01)

(52) U.S. Cl.
 CPC .......... *H04L 1/1861* (2013.01); *H04L 5/0055* (2013.01); *H04W 72/1273* (2013.01)

(58) Field of Classification Search
 CPC ... H04L 1/1861; H04L 5/0055; H04L 1/1854; H04W 72/1273; H04W 72/04
 See application file for complete search history.

(56) References Cited

U.S. PATENT DOCUMENTS

| 2014/0269453 A1* | 9/2014 | Papasakellariou .... H04L 1/1854 370/280 |
| 2014/0293893 A1* | 10/2014 | Papasakellariou .... H04W 72/04 370/329 |

(Continued)

FOREIGN PATENT DOCUMENTS

| CN | 101958777 A | 1/2011 |
| CN | 102413572 A | 4/2012 |

(Continued)

OTHER PUBLICATIONS

International Search Report and Written Opinion dated Nov. 1, 2018 for International Application No. PCT/CN2018/076710, filed on Feb. 13, 2018 (7 pages).

*Primary Examiner* — Hoang-Chuong Q Vu
(74) *Attorney, Agent, or Firm* — Perkins Coie LLP

(57) ABSTRACT

Disclosed are methods, apparatus and systems for reliable information transmission for Ultra-Reliable Low Latency Communication (URLLC) in both (Long Term Evolution) LTE-Advanced and New Radio (NR) systems. In some embodiments, a method includes detecting a downlink transmission on a set of downlink resources, and transmitting a set of signals on a set of uplink resources, which are associated with the set of downlink resources, and where portions of a first and second of the set of signals are identical. In other embodiments, a method includes determining, based on a transmission time, that one or more of a plurality of time units comprises a reference signal, identifying a reference pattern for transmission based on the determining, and transmitting a set of signals comprising the reference pattern during the plurality of time units.

20 Claims, 9 Drawing Sheets

(56) References Cited

U.S. PATENT DOCUMENTS

| | | | |
|---|---|---|---|
| 2015/0131579 A1* | 5/2015 | Li ........................ | H04L 1/189 |
| | | | 370/329 |
| 2015/0280876 A1* | 10/2015 | You ...................... | H04L 5/0044 |
| | | | 370/329 |
| 2016/0353443 A1* | 12/2016 | Desai ................... | H04L 5/0092 |
| 2017/0134124 A1 | 5/2017 | Lee et al. | |
| 2017/0264419 A1* | 9/2017 | Fakoorian .............. | H04W 4/70 |
| 2018/0234213 A1* | 8/2018 | Han ..................... | H04L 1/1854 |
| 2019/0222255 A1* | 7/2019 | Nammi ................. | H04L 1/1896 |
| 2020/0007298 A1* | 1/2020 | Korhonen ............ | H04L 5/0055 |
| 2020/0022175 A1* | 1/2020 | Xiong .................. | H04L 1/1861 |
| 2020/0153597 A1* | 5/2020 | Yi ........................ | H04L 1/1858 |
| 2020/0178226 A1* | 6/2020 | Papasakellariou .. | H04W 52/325 |
| 2021/0143945 A1* | 5/2021 | Park ..................... | H04L 1/1896 |
| 2021/0195567 A1* | 6/2021 | Yi ........................ | H04L 5/0055 |

FOREIGN PATENT DOCUMENTS

| | | |
|---|---|---|
| CN | 104284429 A | 1/2015 |
| CN | 106301670 A | 1/2017 |

\* cited by examiner

RELIABLE INFORMATION TRANSMISSION METHOD AND APPARATUS

CROSS REFERENCE TO RELATED APPLICATIONS

This patent document is a continuation of and claims benefit of priority to International Patent Application No. PCT/CN2018/076710, filed on Feb. 13, 2018. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to support much more reliable coverage and huge number of connections.

SUMMARY

This document relates to methods, systems, and devices for reliable information transmission in Long Term Evolution (LTE) and New Radio (NR) systems.

In one exemplary aspect, a wireless communication method is disclosed. The method includes detecting at least one downlink transmission on a set of downlink resources, and transmitting a set of signals on a set of uplink resources based on the detecting, where the set of downlink resources is associated with the set of uplink resources, and where a portion of a first of the set of signals is identical to a portion of a second of the set of signals.

In another exemplary aspect, a wireless communication method is disclosed. The method includes determining, based on at least a transmission time, that one or more of a plurality of time units comprises a reference signal, identifying a reference pattern for transmission based on the determining, and transmitting a set of signals comprising the reference pattern during the plurality of time units.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Ultra-Reliable Low Latency Communication (URLLC) is an important scenario in both LTE-Advanced and NR systems. In URLLC communication, transmission latency and reception are expected to meet requirements that are much more stringent compared to traditional wireless communications such as Long Term Evolution (LTE). To meet overall stringent system requirements, the reliability of each physical channel should be maintained, and repeating transmissions is a fairly simple method of enhancing reliability. In an example, the reliability of the physical uplink control channel (PUCCH) may be enhanced by repeating HARQ-ACK indications. In another example, if physical downlink shared channel (PDSCH) and/or physical uplink shared channel (PUSCH) repetition is introduced to enhance reliability, a unified DMRS pattern may be employed across all the repeated transmissions.

Embodiments of the disclosed technology solve several issues related to reliable (or repeated) transmissions in URLLC in LTE-Advanced and NR systems. Some embodiments may achieve the reliability by providing a set of rules that establish which transmissions may be repeated or shared in a set of resources. For example, this patent document discloses rules for the repetition of hybrid automatic repeat request (HARQ) acknowledgement (ACK) and negative acknowledgement (NACK) indicators, the repetition and sharing of the demodulation reference signal (DMRS), and the allocation of resources to reduce the latency and control signaling overhead in NR (alternatively referred to as 5G) systems.

Figure 1:
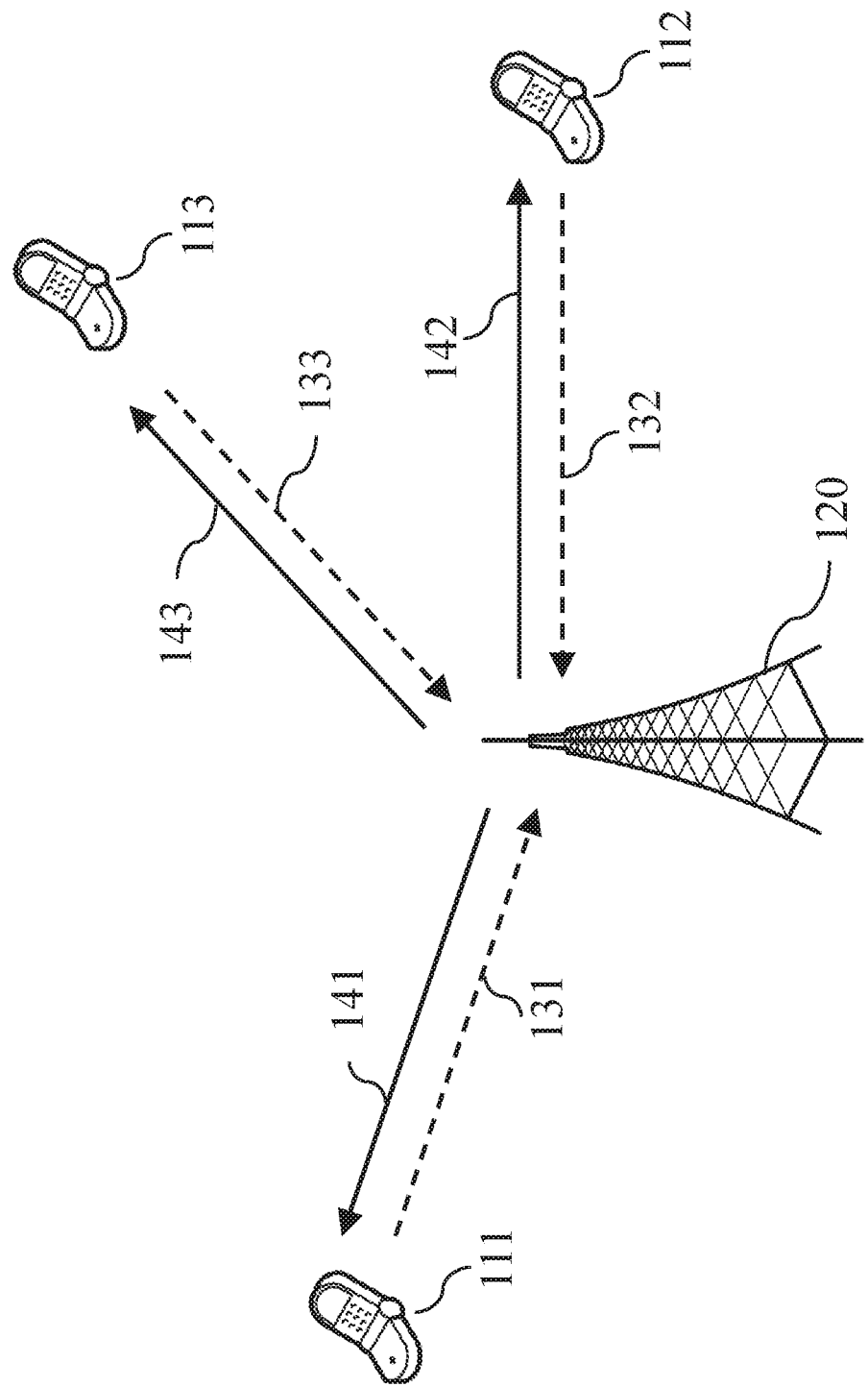
FIG. 1 shows an example of a base station (BS) and user equipment (UE) in wireless communication, in accordance with some embodiments of the presently disclosed technology.

FIG. 1 shows an example of a wireless communication system that includes a base station (BS) 120 and one or more user equipment (UE) 111, 112 and 113. In some embodiments, the base station may transmit downlink (e.g. PDSCH) transmissions (141, 142, 143) to the UEs in time units configured for that purpose. In response to detecting the downlink transmissions, the UEs may transmit HARQ-ACK (131, 132, 133) in time units that are associated with the time units used for the downlink transmissions.

Repeated Transmission of HARQ-ACK

Exemplary Embodiment 1

Figure 2:
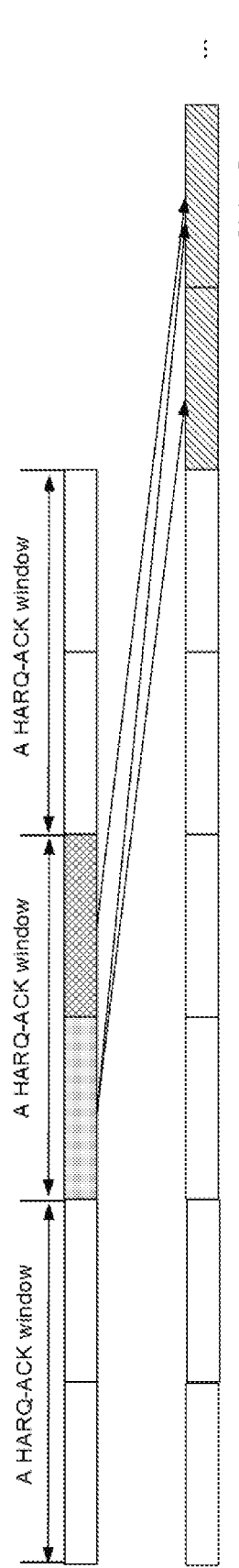
FIG. 2 shows an example of a timing diagram for reliable information transmission.

FIG. 2 shows an exemplary timing diagram for reliable information transmission. As shown therein, every two downlink transmission time units are defined as a hybrid automatic repeat request (HARQ) acknowledgement (ACK) window. In some embodiments, the time units may be a transmission time interval (TTI) or a shortened TTI (sTTI). In other embodiments, the time units may be timeslots, e.g. slots defined in LTE-Advanced or slots defined in NR.

In some embodiments, the HARQ-ACK could be a positive acknowledgement (ACK) or a negative acknowledgement (NACK); e.g. a HARQ-ACK indication may include an ACK or a NACK. In other embodiments, the HARQ-ACK indication may indicate successfully receiving (ACK or '1') or failing to receive (NACK or '0') a transmission. In yet other embodiments, the HARQ-ACK indication may indicate successfully decoding (ACK or '1') or failing to decode (NACK or '0') a transmission that was received in a time unit. In yet other embodiments, a NACK transmission indicates a failure with regard to the operation that corresponding status is related to. In an example, transmitting a HARQ-ACK indication may be interpreted as conveying a reception status. In another example, transmitting a HARQ-ACK may be interpreted as conveying a decoding status.

As shown in the example in FIG. 2, two PDSCH transmissions are scheduled in slot #n and slot #(n+1) within one HARQ-ACK window, respectively. The HARQ-ACK timing corresponding to the PDSCH transmissions are configured (or indicated, or predefined) at uplink slot #(n+4) and slot #(n+5), respectively.

In an example, the network may not configure PUCCH repetition for a UE, and in these scenarios, the HARQ-ACK corresponding to PDSCH of slot #n may also be transmitted in slot #(n+5) by combining it with the HARQ-ACK associated with the PDSCH of slot #(n+1). The concatenation of the HARQ-ACK transmitted in slot #(n+5) is the HARQ-ACK associated to downlink (DL) slot #n first, followed by the HARQ-ACK associated to DL slot #(n+1).

In some embodiments, the number of HARQ-ACK bits to slot #n and slot #(n+1) are both one bit. When the DL transmissions have more than one codewords (or code blocks, or code block groups), the one-bit HARQ-ACK is generated by bundling the HARQ-ACK for each codeword (or code block, or code block group).

In an example, denote the HARQ-ACK to slot #n and slot #(n+1) as 'a' and 'b' respectively, where each of the states 'a' and 'b' may be either '0' or '1'. The UE may obtain two PUCCH resources, X1 and X2 in UL slot #(n+4), and four PUCCH resources, Y1, Y2, Y3 and Y4, in UL slot #(n+5). In this example, the two resources X1 and X2 correspond to '0' and '1' respectively. In a similar manner, the four resources Y1, Y2, Y3 and Y4 correspond to '0,0', '0,1', '1,0" and '1,1' respectively, wherein the first bit represents the HARQ-ACK associated to DL slot #n and the second bit represents the HARQ-ACK associated to DL slot #(n+1).

In some embodiments, the UE may transmit 'a' in slot #(n+4) and transmit 'a, b' in slot #(n+5), or the UE may transmit 'a' in slot #(n+4) and transmit no HARQ-ACK bits in slot #(n+5), or the UE may transmit no HARQ-ACK bits in slot #(n+4) and slot #(n+5).

In some embodiments, the following exemplary UE behavior may be implemented:

(1) For example, if a UE detects PDSCH transmission both in slot #n and slot #(n+1), the UE may transmit 'a' in slot #(n+4) and transmit 'a, b' in slot #(n+5). For example, if the UE decodes the two PDSCH successfully, '1,1' may be transmitted using PUCCH resource Y4. The transmission of '1,1' may be interpreted as the transmission of two bits, each with a value of 1, to indicate that the PDSCH transmissions in slot #n and slot #(n+1) were decoded successfully.

(2) For example, if a UE only detects a PDSCH transmission in slot #(n+1) but does not detect a PDSCH transmission in slot #n, the UE may transmit '0, b' in slot #(n+5). Or the UE may transmit 'b' associated with DL slot #(n+1) in slot #(n+5), which results in either Y1 or Y2 being used in this case. In this example, "UE does not detect a PDSCH transmission in slot #n" may mean that the network does not schedule a PDSCH to UE, or the network transmits a PDSCH but the UE fails to detect it. Since the network knows whether it transmitted a PDSCH in slot #n, if it indeed transmitted, then the network performs blind detection among all four PUCCH resources, otherwise, the network can only blindly detect among two PUCCH resources, e.g. Y1 and Y2 here. In slot #(n+4), the UE would transmit no HARQ-ACK bits associated to PDSCH transmission in slot #n.

(3) For example, if a UE only detects a PDSCH transmission in slot #n but does not detect a PDSCH transmission in slot #(n+1), the UE may transmit 'a' in slot #(n+4). In slot #(n+5), the UE would transmit no HARQ-ACK bits associated to PDSCH transmission in slot #n and slot #(n+1), or the UE would transmit 'a, 0', or the UE would transmit 'a'. In this example, "UE does not detect a PDSCH transmission in slot #(n+1)" means the network does not schedule a PDSCH to UE or the network transmits a PDSCH but the UE fails to detect it.

(4) For example, if a UE does not detect PDSCH transmission in slot #n and slot #(n+1), the UE may transmit no HARQ-ACK bits associated to PDSCH transmission in slot #n and slot #(n+1), or the UE would transmit '0, 0', or the UE would transmit '0' in slot #(n+4), or the UE would transmit '0' in slot #(n+5).

In some embodiments, the UE obtains four PUCCH resources in UL slot #(n+4), and only two out of the four resources are used for 1 bit HARQ-ACK transmission.

In some embodiments, the UE transmits HARQ-ACK associated to DL slot #n. In other embodiments, the more than one bit HARQ-ACK are concatenated with the HARQ-ACK associated to DL slot #(n+1), and are transmitted in slot #(n+5). In yet other embodiments, the more than one bit HARQ-ACK is first bundled to one bit and concatenated with the HARQ-ACK associated to DL slot #(n+1), and then are transmitted in slot #(n+5).

In some embodiments, the number of HARQ-ACK bits is less than 11 bits.

In some embodiments, HARQ-ACK bits is carried on PUSCH.

In some embodiments, there is an indicator field in the downlink control information (DCI) scheduling that indicates whether the PDSCH has been transmitted in slot #n and/or in slot #(n+1). In an example, the indicator field indicates whether the HARQ-ACK associated to PDSCH transmission in slot #n is transmitted in slot #(n+5).

In some embodiments, the downlink transmission in slot #n and slot #(n+1) corresponds to different carriers. In other embodiments, the downlink transmission in slot #n corresponds to a carrier configured for URLLC.

In some embodiments, the size of HARQ-ACK window may be longer than 2 slots. In other embodiments, the size of each HARQ-ACK window may be different. In yet other embodiments, the transmission in each HARQ-ACK window could be discontinuous.

In some embodiments, the time unit is a slot or a shortened transmission time interval (sTTI) with 2/3/7 symbols, or a sub-frame, or a subset of symbols in a slot.

Exemplary Embodiment 2

Figure 3:
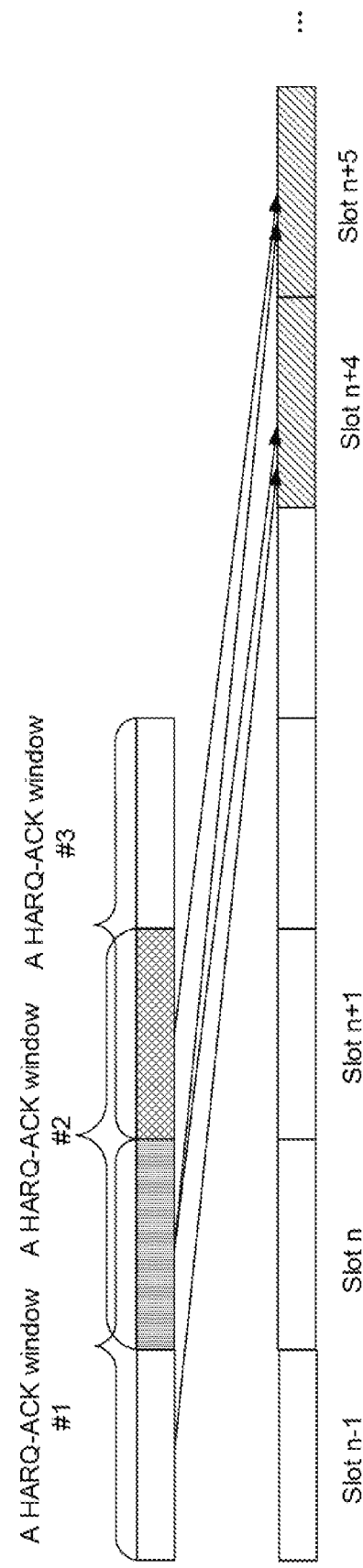
FIG. 3 shows another example of a timing diagram for reliable information transmission.

As shown in FIG. 3, any two arbitrary DL transmission time units may be defined as a HARQ-ACK window. As shown therein, there are two PDSCH transmissions are scheduled in slot #n and slot #(n+1), respectively, within the second HARQ-ACK window. Additionally, the HARQ-ACK timing is configured (or indicated, or predefined) for UL slot #(n+4) and slot #(n+5), respectively.

In scenarios where the network has not configured PUCCH repetition for the UE, the HARQ-ACK corresponding to PDSCH of slot #i is transmitted in slot #(i+k1) and may also be transmitted in slot #(i+k1+1), by combining the HARQ-ACK associated with PDSCH of slot #(i+1). The concatenation of the HARQ-ACK transmitted in slot #(i+k1+1) is the HARQ-ACK associated to DL slot #i followed by the HARQ-ACK associated to DL slot #(i+1). Wherein k1 is the HARQ-ACK timing, e.g. k1=4 time units as shown in FIG. 3.

In some embodiments, the number of HARQ-ACK bits corresponding to slot #n and slot #(n+1) are both one bit. When the DL transmission have more than one codewords (or code blocks, or code block groups), the one-bit HARQ-ACK is generated by bundling the HARQ-ACK for each codeword (or code block, or code block group).

In an example, denote the HARQ-ACK to DL slot #(n−1), slot #n and slot #(n+1) as 'a', 'b' and 'c' respectively, where the state 'a', 'b' and 'c' may be either '0' or '1'. The UE obtains four PUCCH resources, X1, X2, X3 and X4 in UL slot #(n+4), and four PUCCH resources, Y1, Y2, Y3 and Y4 in UL slot #(n+5). The four resources X1, X2, X3 and X4 correspond to '0,0', '0,1', '1,0' and '1,1', respectively, wherein the first bit represents the HARQ-ACK associated to DL slot #(n−1) and the second bit represents the HARQ-ACK associated to DL slot #n. The four resources Y1, Y2, Y3 and Y4 corresponds to '0,0', '0,1', '1,0' and '1,1', respectively, wherein the first bit represents the HARQ-ACK associated to DL slot #n and the second bit represents the HARQ-ACK associated to DL slot #(n+1).

In some embodiments, the UE may transmit 'a, b' in slot #(n+4) and transmit 'b, c' in slot #(n+5), or the UE may transmit no HARQ-ACK bits in slot #(n+4) and slot #(n+5), or the UE may transmit no HARQ-ACK bits in slot #(n+4) and transmit 'b, c' in slot #(n+5), or the UE may transmit 'a, b' in slot #(n+4) and transmit no HARQ-ACK bits in slot #(n+5).

In some embodiments, the following exemplary UE behavior may be defined:

(1) For example, if a UE detects PDSCH transmission in slot #(n−1), slot #n and slot #(n+1), the UE may transmit 'a, b' in slot #(n+4) and transmit 'b, c' in slot #(n+5). For example, if the UE decodes the three PDSCH successfully, '1,1' may be transmitted in both slot #(n+4) and slot #(n+5), using PUCCH resources X4 and Y4 in slot #(n+4) and slot #(n+5), respectively.

(2) For example, if a UE detects PDSCH transmission in slot #n and slot #(n+1), but does not detect a PDSCH transmission in slot #(n−1), the UE may transmit '0, b' in slot #(n+4) and transmit 'b, c' in slot #(n+5), or the UE may transmit 'b' in slot #(n+4) and transmit 'b, c' in slot #(n+5).

(3) For example, if a UE detects a PDSCH transmission in slot #(n−1) and slot #(n+1) but does not detect a PDSCH transmission in slot #n, the UE may transmit '0, c' in slot #(n+5), or the UE may transmit 'c' associated with DL slot #(n+1) in slot #(n+5) using either Y1 or Y2 in slot #(n+5). The UE may transmit no HARQ-ACK bits in slot #(n+4), or the UE may transmit 'a, 0', or the UE may transmit 'a'.

(4) For example, if a UE detects PDSCH transmission in slot #(n−1) and slot #n, but does not detect a PDSCH transmission in slot #(n+1), the UE may transmit 'a, b' in slot #(n+4). The UE may transmit no HARQ-ACK bits in slot #(n+5), or the UE may transmit 'b, 0', or the UE may transmit 'b'.

(5) For example, if a UE detects PDSCH transmission in slot #(n+1), but does not detect a PDSCH transmission in slot #(n−1) and slot #n, the UE may transmit no HARQ-ACK bits in slot #(n+4), and '0, c' in slot #(n+5). Or the UE may transmit 'c' associated with DL slot #(n+1) in slot #(n+5).

(6) For example, if a UE detects PDSCH transmission in slot #n, but does not detect a PDSCH transmission in slot #(n−1) and slot #(n+1), the UE may transmit '0, b' in slot #(n+4), or the UE may transmit 'b' in slot #(n+4). The UE may transmit no HARQ-ACK bits in slot #(n+5), or the UE may transmit 'b, 0', or the UE may transmit 'b'.

(7) For example, if a UE detects PDSCH transmission in slot #(n−1), but does not detect a PDSCH transmission in slot #n and slot #(n+1), the UE may transmit no HARQ-ACK bits in slot #(n+4), or the UE may transmit 'a, 0', or the UE may transmit 'a'. The UE may transmit no HARQ-ACK bits in slot #(n+5), or the UE may transmit '0, 0', or the UE may transmit '0'.

(8) For example, if a UE does not detect a PDSCH transmission in slot #(n−1), slot #n and slot #(n+1), the UE may transmit no HARQ-ACK bits in slot #(n+4) and slot #(n+5), or the UE may transmit '0, 0' in slot #(n+4) and slot #(n+5), or the UE may transmit '0' in slot #(n+4) and slot #(n+5).

For the examples described, "UE does not detect a PDSCH transmission" may mean the network does not schedule a PDSCH to UE or the network transmits a PDSCH but the UE fails to detect it.

Exemplary Embodiment 3

Figure 4:
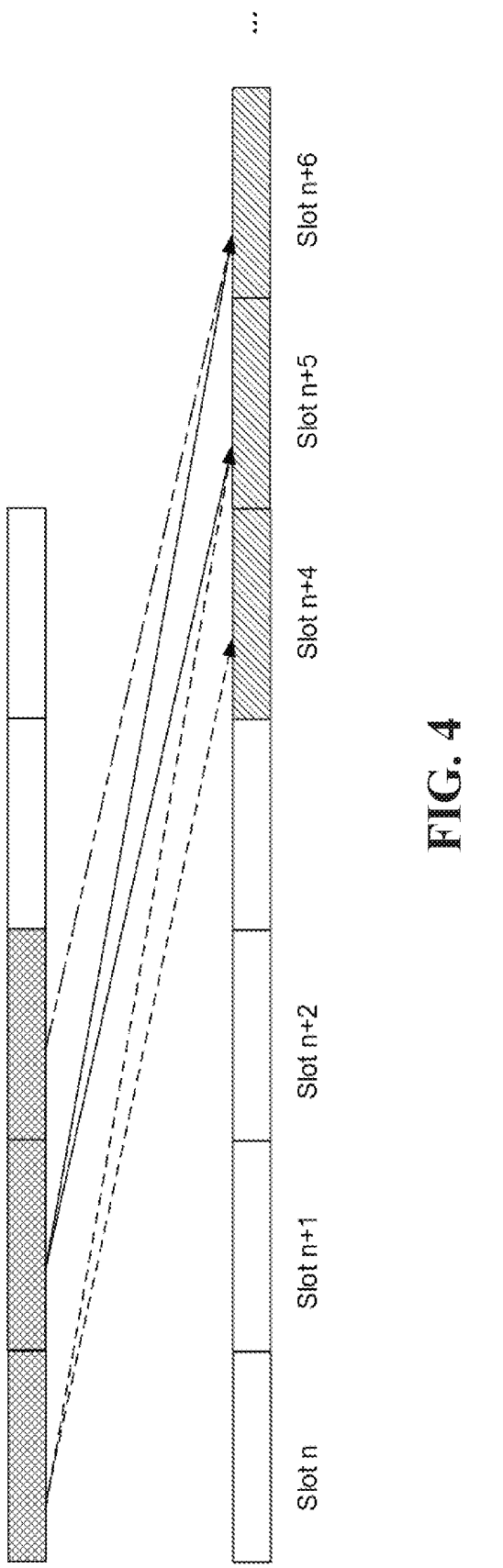
FIG. 4 shows yet another example of a timing diagram for reliable information transmission.

As shown in the example in FIG. 4, the network may schedule M=3 downlink transmissions in slot #n, transmitted in slot #n, slot #(n+1) and slot #(n+2), respectively. The HARQ-ACK timing k equals 4 in this example. The HARQ-ACK associated with slot #n is transmitted in slot #(n+4) and slot #(n+5). The HARQ-ACK associated slot #(n+1) is transmitted in slot #(n+5) and slot #(n+6). The HARQ-ACK associated slot #(n+2) is transmitted in slot #(n+6).

In an example, denote the HARQ-ACK to DL slot #n, slot #(n+1) and slot #(n+2) as 'a', 'b' and 'c' respectively, wherein the states 'a', 'b' and 'c' may be either '0' or '1'. Using this exemplary notation, the HARQ-ACK transmitted in slot #(n+4), slot #(n+5) and slot #(n+6) is 'a', 'a, b' and 'b, c' respectively.

In some embodiments, the state 'a', 'b' and 'c' may be a vector that contains more than one bit.

In some embodiments, the UE obtains four PUCCH resources in UL slot #(n+4), and only two out of the four resources are used for 1-bit HARQ-ACK transmissions.

Exemplary Embodiment 4

Figure 5:
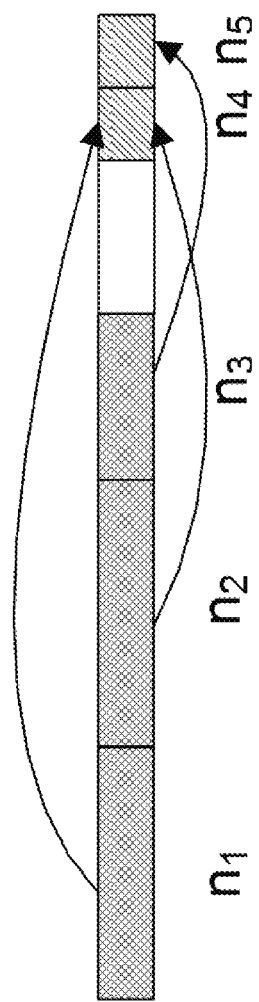
FIG. 5 shows yet another example of a timing diagram for reliable information transmission.

As shown in the example in FIG. 5, the network may schedule M=3 downlink transmissions in time units n1, n2 and n3 respectively. The HARQ-ACK timing associated to the PDSCH transmission in n1 and n2 both corresponds to time unit n4. The HARQ-ACK timing associated to the PDSCH transmission in n3 corresponds to time unit n5.

In an example, denote the HARQ-ACK to DL time n1, n2 and n3 as 'a', 'b' and 'c' respectively, where the state 'a', 'b' and 'c' may be either '0' or '1'. Then, the HARQ-ACK transmitted in time n4, n5 is 'a, b', and 'a, b, c' respectively. Or the HARQ-ACK associated to the PDSCH transmission in n1 and n2 is firstly bundled to one bit. If the bundled bit is denoted as 'x', the HARQ-ACK transmitted in time n5 would be 'x, c'.

In some embodiments, the state 'a', 'b' and 'c' may be a vector which contains more than one bit.

Example Designs of DMRS Pattern in PDSCH/PUSCH Repetition

When the network configures the use of PDSCH/PUSCH repetition, it is beneficial to design the DMRS pattern among the repeated transmission so as to reduce reference signal (RS) overhead. Embodiments of the disclosed technology reduce or preclude the DMRS in some of the repetitions of PDSCH and/or PUSCH.

In some scenarios, the URLLC transmission may puncture some of the resource elements (REs) used for an ongoing enhanced Mobile Broadband (eMBB) transmission. This would severely impact the eMBB UEs if the puncturing occurred in both the data and the DMRS of the eMBB transmission. Thus, the URLLC transmission does not typically puncture the DMRS of an eMBB transmission.

Embodiments of the disclosed technology are designed so that some of the repetitions do not contain any DMRS REs. Furthermore, the DMRS pattern may be different if the initial transmission is transmitted in different time units. This results in the DMRS pattern being different for at least two repetition transmissions with different initial transmission starting time units. In the following examples, the time unit is a shortened TTI (sTTI), but embodiments of the disclosed technology are applicable to a variety of time units, including but not limited to, a TTI, an sTTI, a slot in an LTE-Advanced system, and a slot in a NR system.

In some embodiments, the DMRS REs for the downlink (DL) are meant to denote the DMRS for URLLC (and not the legacy DMRS REs).

Figure 6:
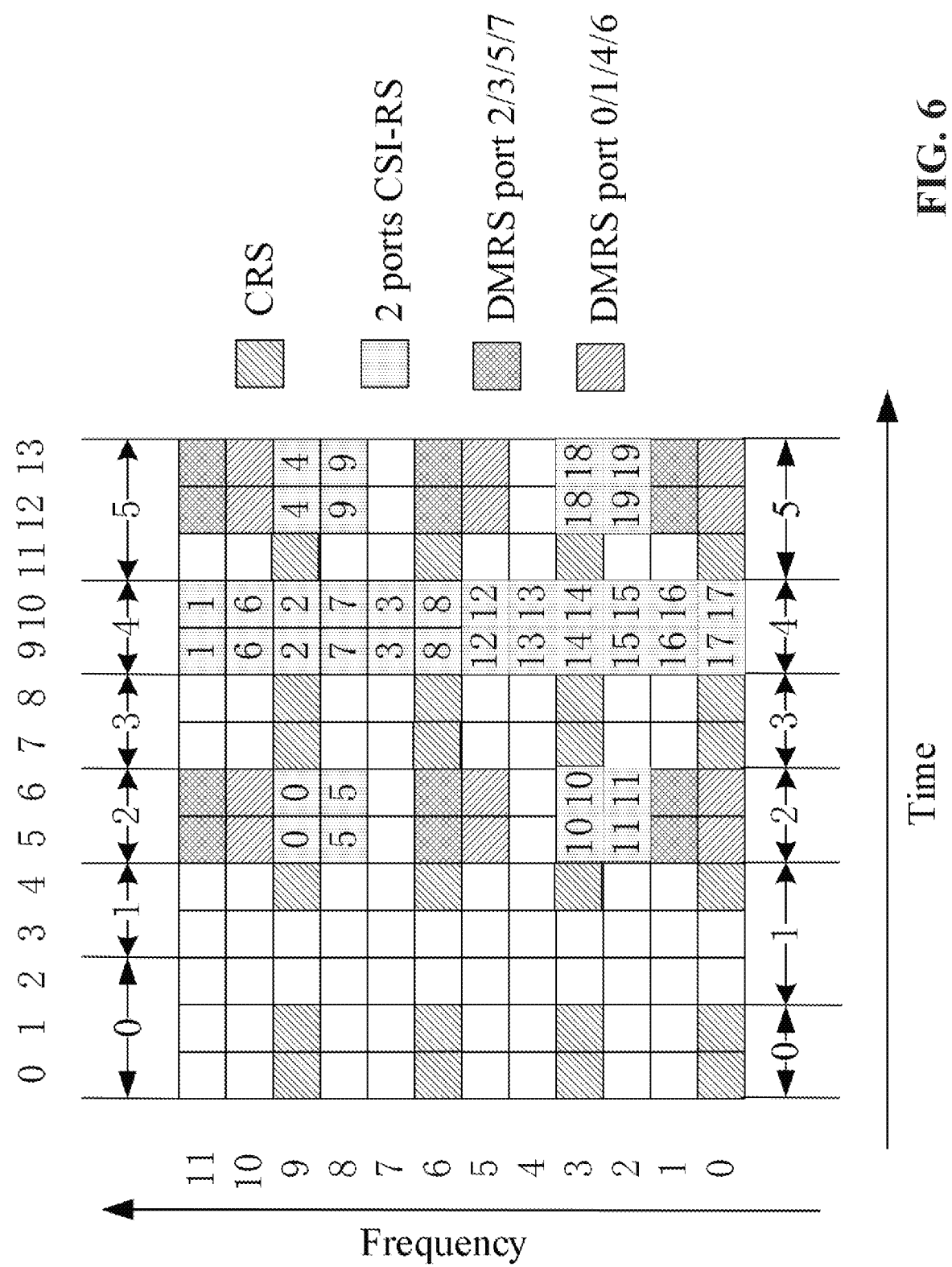
FIG. 6 shows an example of reference signal allocations for a downlink transmission in the time/frequency plane for reliable information transmission.

Downlink DMRS Patterns. FIG. 6 shows an example of reference signal allocations for a downlink transmission in the time/frequency plane for reliable information transmission. Specifically, FIG. 6 shows the current shortened TTI (sTTI) pattern in one subframe and the RS positions defined in legacy LTE for DL, wherein the RS includes Cell-Specific Reference Signal (CRS), Channel State Information-Reference Signal (CSI-RS) and DMRS. In certain scenarios, it may be the case that the RS overhead is very large in some of the sTTIs, e.g. sTTI #2 and sTTI #3. Note that in a given time of period, only one CSI-RS configuration may be configured. The example in FIG. 6 shows 20 two-port CSI-RS configurations.

For the following descriptions of the exemplary embodiments of the disclosed technology, the number of repetitions is defined as N, where the index of each repetition is denoted i=0, 1, 2, . . . , N−1, and the initial transmission is indexed as 0.

Scheme 1. In an example, transmissions indexed with an even number contain DMRS. For transmissions indexed with an odd number, the transmission contains no DMRS.

Scheme 2-1. In an example, the initial transmission always contains DMRS, and every two repetitions contains DMRS. But DMRS is not transmitted in sTTI #2 or sTTI #5 if it is not the initial transmission. The DMRS originally transmitted in sTTI #2 or sTTI #5 is shifted to the previous or latter sTTI that contains no DMRS.

In an example, the initial transmission is sTTI #0 and N=4. Then the DMRS would be transmitted in sTTI #0 and sTTI #1, or sTTI #0 and sTTI #3.

In some embodiments, sTTI #2 or sTTI #5 in this scheme may also be sTTI #0 or sTTI #3, which contain CRS.

Scheme 3. In an example, every two repetitions contain DMRS. But DMRS is not transmitted in sTTI #2 or sTTI #5. The DMRS originally transmitted in sTTI #2 or sTTI #5 is shifted to the previous or subsequent sTTI that contains no DMRS. For example, the initial transmission is sTTI #2 and N=4. Then the DMRS would be transmitted in sTTI #3 and sTTI #4.

Scheme 4. In some embodiments, DMRS sharing across subframes may not be supported, and Schemes 1-3 described above should be initialized at the beginning of each subframe. For example, if Scheme 1 is used with initialization at the beginning of each subframe, the initial transmission is sTTI #3 is in subframe #A and N=4. In this case, the DMRS would be transmitted in sTTI #3 and sTTI #5 in subframe #A and sTTI #0 in subframe #(A+1).

In an example, the DMRS pattern for PDSCH repetition with N=4 is given in the example shown in Table 1-1.

For the example described below, an "R" is used to denote that an sTTI includes a DMRS, whereas a "D" is used to denote that an sTTI does not include (or excludes) a DMRS.

In the example in Table 1-1, a baseline pattern 'It, D, R, D' is used except for some cases when the PDSCH repetition is across a subframe boundary. For example, when the initial transmission is in sTTI #3, sTTI #0 in the subsequent subframe may contain the DMRS since it cannot share the DMRS from the sTTI in the previous subframe.

TABLE 1-1

DMRS pattern for PDSCH repetition with N = 4

|  |  | sTTI index | | | | | | | |
| --- | --- | --- | --- | --- | --- | --- | --- | --- | --- |
| Initial transmission |  | 0 | 1 | 2 | 3 | 4 | 5 | 0 | 1 | 2 |
| Initial transmission is in sTTI 0 |  | R | D | R | D | | | | | |
| Initial transmission is in sTTI 1 |  |  | R | D | R | D | | | | |
| Initial transmission is in sTTI 2 |  |  |  | R | D | R | D | | | |
| Initial transmission is in sTTI 3 | Option 1 |  |  |  | R | D | R | R | | |
|  | Option 2 |  |  |  | D | R | D | R | | |
| Initial transmission is in sTTI 4 |  |  |  |  |  | R | D | R | D | |
| Initial transmission is in sTTI 5 | Option 1 |  |  |  |  |  | R | R | D | R |
|  | Option 2 |  |  |  |  |  | R | D | R | D |

In some embodiments, the DMRS pattern for PDSCH repetition with N=3 is the first three columns of the DMRS pattern for N=4 in each row, shown in Table 1-1.

In some embodiments, the DMRS pattern for PDSCH repetition with N=2 is the first two columns of the DMRS pattern for N=4 in each row, shown in Table 1-1.

In the example in Table 1-2, the DMRS pattern avoids placing the DMRS in sTTI #2 and sTTI #5. One exception is Option 2 of this example case (shown in Table 1-2) when the initial transmission is in sTTI #5. This is because sTTI #5 includes the DMRS if DMRS sharing across subframe boundary is not supported.

TABLE 1-2

DMRS pattern for PDSCH repetition with N = 4

| Initial transmission | | sTTI index | | | | | | | | |
|---|---|---|---|---|---|---|---|---|---|---|
| | | 0 | 1 | 2 | 3 | 4 | 5 | 0 | 1 | 2 |
| Initial transmission is in sTTI 0 | | R | D | D | R | | | | | |
| Initial transmission is in sTTI 1 | | | R | D | R | D | | | | |
| Initial transmission is in sTTI 2 | | | | D | R | R | D | | | |
| Initial transmission is in sTTI 3 | Option 1 | | | | R | R | D | R | | |
| | Option 2 | | | | D | R | D | R | | |
| Initial transmission is in sTTI 4 | | | | | | R | D | R | D | |
| Initial transmission is in sTTI 5 | Option 1 | | | | | | D | R | R | D |
| | Option 2 | | | | | | R | D | R | D |

In some embodiments, the DMRS pattern for PDSCH repetition with N=3 is the first three column of the DMRS pattern for N=4 in each row, shown in Table 1-2.

In some embodiments, the DMRS pattern for PDSCH repetition with N=2 is the first two column of the DMRS pattern for N=4 in each row, shown in Table 1-2.

In the example in Table 1-3, the DMRS pattern avoids placing DMRS in sTTI #0 and sTTI #3. One exception is Option 2 of this example when the initial transmission is in sTTI #3. This is because sTTI #0 in the subsequent subframe contains the DMRS if DMRS sharing across subframe boundary is not supported.

TABLE 1-3

DMRS pattern for PDSCH repetition with N = 4

| Initial transmission | | sTTI index | | | | | | | | |
|---|---|---|---|---|---|---|---|---|---|---|
| | | 0 | 1 | 2 | 3 | 4 | 5 | 0 | 1 | 2 |
| Initial transmission is in sTTI 0 | | D | R | R | D | | | | | |
| Initial transmission is in sTTI 1 | Option 1 | | R | D | D | R | | | | |
| | Option 2 | | R | R | D | R | | | | |
| | Option 3 | | D | R | D | R | | | | |
| Initial transmission is in sTTI 2 | | | | R | D | R | D | | | |
| Initial transmission is in sTTI 3 | Option 1 | | | | D | R | R | D | | |
| | Option 2 | | | | D | R | D | R | | |
| Initial transmission is in sTTI 4 | | | | | | R | D | D | R | |
| Initial transmission is in sTTI 5 | Option 1 | | | | | | R | D | R | D |
| | Option 2 | | | | | | R | D | R | R |

In some embodiments, the DMRS pattern for PDSCH repetition with N=3 is the first three column of the DMRS pattern for N=4 in each row, shown in Table 1-3.

In some embodiments, the DMRS pattern for PDSCH repetition with N=2 is the first two column of the DMRS pattern for N=4 in each row, shown in Table 1-3.

In the examples in Table 1-4 and Table 1-5, an sTTI either always includes or does not include the DMRS, irrespective of the sTTI in initial transmission occurs in. In an example, sTTI with an even index always contains DMRS and sTTI with an odd index always contain no DMRS in Table 1-4. In another example with the opposite configuration, sTTI with an even index always contain no DMRS and sTTI with an odd index always contain DMRS in Table 1-5.

TABLE 1-4

DMRS pattern for PDSCH repetition with N = 4

| Initial transmission | sTTI index | | | | | | | | |
|---|---|---|---|---|---|---|---|---|---|
| | 0 | 1 | 2 | 3 | 4 | 5 | 0 | 1 | 2 |
| Initial transmission is in sTTI 0 | R | D | R | D | | | | | |
| Initial transmission is in sTTI 1 | | D | R | D | R | | | | |
| Initial transmission is in sTTI 2 | | | R | D | R | D | | | |
| Initial transmission is in sTTI 3 | | | | D | R | D | R | | |
| Initial transmission is in sTTI 4 | | | | | R | D | R | D | |
| Initial transmission is in sTTI 5 | | | | | | D | R | D | R |

TABLE 1-5

DMRS pattern for PDSCH repetition with N = 4

| Initial transmission | sTTI index | | | | | | | | |
|---|---|---|---|---|---|---|---|---|---|
| | 0 | 1 | 2 | 3 | 4 | 5 | 0 | 1 | 2 |
| Initial transmission is in sTTI 0 | D | R |   | D | R |   |   |   |   |
| Initial transmission is in sTTI 1 |   | R |   | D | R | D |   |   |   |
| Initial transmission is in sTTI 2 |   |   | D | R |   | D | R |   |   |
| Initial transmission is in sTTI 3 |   |   |   | R |   | D | R | D |   |
| Initial transmission is in sTTI 4 |   |   |   |   | D | R |   | D | R |
| Initial transmission is in sTTI 5 |   |   |   |   |   | R |   | D | R | D |

Another scenario, in the context of Table 1-5, includes the case where sTTI #0 is used for legacy PDCCH transmission, and there is no PDSCH transmission in sTTI #0.

In some embodiments, the DMRS pattern for PDSCH repetition with N=3 is the first three columns of the DMRS pattern for N=4 in each row, shown in Table 1-4 or Table 1-5.

In some embodiments, the DMRS pattern for PDSCH repetition with N=2 is the first two columns of the DMRS pattern for N=4 in each row, shown in Table 1-4 or Table 1-5.

In some embodiments, the DMRS pattern for PDSCH repetition with N=3 is given in the example shown in Table 1-6.

TABLE 1-6

DMRS pattern for PDSCH repetition with N = 3

| Initial transmission | sTTI index | | | | | | | |
|---|---|---|---|---|---|---|---|---|
| | 0 | 1 | 2 | 3 | 4 | 5 | 0 | 1 |
| Initial transmission is in sTTI 0 | D | R | D |   |   |   |   |   |
| Initial transmission is in sTTI 1 |   | D | R | D |   |   |   |   |
| Initial transmission is in sTTI 2 |   |   | D | R | D |   |   |   |
| Initial transmission is in sTTI 3 |   |   |   | D | R | D |   |   |
| Initial transmission is in sTTI 4 |   |   |   |   | D | R | D |   |
| Initial transmission is in sTTI 5 |   |   |   |   |   | R | R | D |

In some embodiments, the DMRS pattern for PDSCH repetition with N=2 is given in the example shown in Table 1-7.

TABLE 1-7

DMRS pattern for PDSCH repetition with N = 2

| Initial transmission | sTTI index | | | | | | |
|---|---|---|---|---|---|---|---|
| | 0 | 1 | 2 | 3 | 4 | 5 | 0 |
| Initial transmission is in sTTI 0 | D | R |   |   |   |   |   |
| Initial transmission is in sTTI 1 |   | D | R |   |   |   |   |
| Initial transmission is in sTTI 2 |   |   | D | R |   |   |   |
| Initial transmission is in sTTI 3 |   |   |   | D | R |   |   |
| Initial transmission is in sTTI 4 |   |   |   |   | D | R |   |
| Initial transmission is in sTTI 5 |   |   |   |   |   | R | R |

In some embodiments, the network defines at least two DMRS pattern tables, and semi-statically or dynamically configures one DMRS pattern table to a UE.

In some embodiments, one single Radio Resource Control (RRC) signaling includes the number of repetitions and its associated DMRS pattern table index is defined in the network, and configured to a UE.

Uplink DMRS Patterns. For the UL examples described below, an "R" is used to denote the symbol is a DMRS symbol, and a "D" is used to denote the symbol is a data symbol.

In some embodiments, the DMRS pattern for PUSCH repetition with N=4 is given in the example shown in Table 2-1.

TABLE 2-1

DMRS pattern for PUSCH repetition with N = 4

| Initial transmission | | sTTI index | | | | | | | | |
|---|---|---|---|---|---|---|---|---|---|---|
| | | 0 | 1 | 2 | 3 | 4 | 5 | 0 | 1 | 2 |
| Initial transmission is in sTTI 0 | | DDR | DD | DR | DD |   |   |   |   |   |
| Initial transmission is in sTTI 1 | |   | DR | DD | DR | DD |   |   |   |   |
| Initial transmission is in sTTI 2 | Option 1 |   |   | DR | DD | DR | DDD |   |   |   |
| | Option 2 |   |   | DR | DD | DD | RDD |   |   |   |
| Initial transmission is in sTTI 3 | Option 1 |   |   |   | DR | DD | RDD | RDD |   |   |
| | Option 2 |   |   |   | DD | DR | DDD | RDD |   |   |
| Initial transmission is in sTTI 4 | |   |   |   |   | DD | RDD | DDR | DD |   |
| Initial transmission is in sTTI 5 | Option 1 |   |   |   |   |   | RDD | RDD | DR | DD |
| | Option 2 |   |   |   |   |   | RDD | DDD | RD | DD |

In some embodiments, if the DMRS sharing across slot is not supported, the DMRS pattern for PUSCH repetition with N=4 is given in the example shown in Table 2-2.

For the cases where the N repetition transmissions are across the subframe boundary, there may be two DMRS symbols in each DMRS pattern with different starting times.

TABLE 2-2

DMRS pattern for PUSCH repetition with N = 4

| | | sTTI index | | | | | | | | |
|---|---|---|---|---|---|---|---|---|---|---|
| Initial transmission | | 0 | 1 | 2 | 3 | 4 | 5 | 0 | 1 | 2 |
| Initial transmission is in sTTI 0 | | DDR | DD | RD | RD | | | | | |
| Initial transmission is in sTTI 1 | | | DR | DD | DR | DD | | | | |
| Initial transmission is in sTTI 2 | Option 1 | | | DR | DD | DR | DDD | | | |
| | Option 2 | | | DR | DR | DD | RDD | | | |
| Initial transmission is in sTTI 3 | Option 1 | | | | DR | DD | RDD | RDD | | |
| | Option 2 | | | | DD | DR | DDD | RDD | | |
| Initial transmission is in sTTI 4 | | | | | | DD | RDD | DDR | DD | |
| Initial transmission is in sTTI 5 | Option 1 | | | | | | RDD | RDD | DR | DD |
| | Option 2 | | | | | | RDD | DDD | RD | DD |

In some embodiments, for PUSCH repetition with N=3, there may be two DMRS symbols in each DMRS pattern with different starting times.

In some embodiments, DMRS resource elements (RE) may only be placed on part of the REs, and at least in one of the two DMRS symbols. In some embodiments, at least one of the two DMRS symbols has a comb-like or interlaced-FDMA structure.

In some embodiments, the DMRS pattern for PUSCH repetition with N=3 is given in the example shown in Table 2-3.

In some embodiments, the DMRS symbol may be located at the symbol with an index of floor(M-½), where M is the total symbols in all N repetition transmissions.

In some embodiments, the DMRS symbol may be located at the symbol with an index of floor(M-½) when each repetition transmission contains two symbols. For cases where a repetition transmission includes three symbols, there is a DMRS symbol in this transmission.

TABLE 2-3

DMRS pattern for PUSCH repetition with N = 3

| | | sTTI index | | | | | | | |
|---|---|---|---|---|---|---|---|---|---|
| Initial transmission | | 0 | 1 | 2 | 3 | 4 | 5 | 0 | 1 |
| Initial transmission is in sTTI 0 | Option 1 | DDR | DD | RD | | | | | |
| | Option 2 | DDR | DR | DD | | | | | |
| Initial transmission is in sTTI 1 | Option 1 | | DR | DD | RD | | | | |
| | Option 2 | | DD | RD | RD | | | | |
| | Option 3 | | DD | RR | DD | | | | |
| Initial transmission is in sTTI 2 | Option 1 | | | DR | DD | RD | | | |
| | Option 2 | | | DD | RD | RD | | | |
| | Option 3 | | | DD | RR | DD | | | |
| Initial transmission is in sTTI 3 | Option 1 | | | | DD | RD | RDD | | |
| | Option 2 | | | | DR | DD | RDD | | |
| Initial transmission is in sTTI 4 | | | | | | DD | RDD | RDD | |
| Initial transmission is in sTTI 5 | | | | | | | RDD | DDR | DD |

In some embodiments, for PUSCH repetition with N=3, there may be only one DMRS symbol in each DMRS pattern with different starting times.

In some embodiments, for PUSCH repetition with N=3, there may be only one DMRS symbol in each DMRS pattern with different starting time, except for cases wherein the N repetition transmissions are across the subframe boundary.

In some embodiments, the DMRS symbol may be located at the symbol with an index of floor(M-½) except for cases where the repetition is across the subframe boundary, where M is the total symbols in all N repetition transmissions.

In some embodiments, the DMRS pattern for PUSCH repetition with N=3 is given in the example shown in Table 2-4.

TABLE 2-4

DMRS pattern for PUSCH repetition with N = 3

| | | sTTI index | | | | | | | |
|---|---|---|---|---|---|---|---|---|---|
| Initial transmission | | 0 | 1 | 2 | 3 | 4 | 5 | 0 | 1 |
| Initial transmission is in sTTI 0 | Option 1 | DDR | DD | DD | | | | | |
| | Option 2 | DDD | RD | DD | | | | | |

TABLE 2-4-continued

DMRS pattern for PUSCH repetition with N = 3

| Initial transmission | | sTTI index | | | | | | | |
|---|---|---|---|---|---|---|---|---|---|
| | | 0 | 1 | 2 | 3 | 4 | 5 | 0 | 1 |
| Initial transmission is in | Option 1 | DD | RD | DD | | | | | |
| | Option 2 | DD | DR | DD | | | | | |
| Initial transmission is in sTTI 2 | Option 1 | | DD | RD | DD | | | | |
| | Option 2 | | DD | DR | DD | | | | |
| | Option 3 | | | | | | | | |
| Initial transmission is in sTTI 3 | Option 1 | | | DD | DD | RDD | | | |
| | Option 2 | | | DD | DR | DDD | | | |
| Initial transmission is in sTTI 4 | Option 1 | | | | DD | RDD | DDD | | |
| | Option 2 | | | | DD | DRD | DDD | | |
| | Option 3 | | | | DD | RDD | RDD | | |
| Initial transmission is in sTTI 5 | Option 1 | | | | | DDD | RDD | DD | |
| | Option 2 | | | | | DDD | DRD | DD | |
| | Option 3 | | | | | RDD | DDR | DD | |

In some embodiments, the DMRS pattern for PUSCH repetition with N=2 is given in the example shown in Table 2-5.

TABLE 2-5

DMRS pattern for PUSCH repetition with N = 2

| Initial transmission | | sTTI index | | | | | | |
|---|---|---|---|---|---|---|---|---|
| | | 0 | 1 | 2 | 3 | 4 | 5 | 0 |
| Initial transmission is in sTTI 0 | | DDR | DD | | | | | |
| Initial transmission is in sTTI 1 | Option 1 | | DR | DD | | | | |
| | Option 2 | | DD | RD | | | | |
| Initial transmission is in sTTI 2 | Option 1 | | | DR | DD | | | |
| | Option 2 | | | DD | RD | | | |
| Initial transmission is in sTTI 3 | Option 1 | | | | DR | DD | | |
| | Option 2 | | | | DD | RD | | |
| Initial transmission is in sTTI 4 | | | | | | DD | RDD | |
| Initial transmission is in sTTI 5 | Option 1 | | | | | | RDD | RDD |
| | Option 2 | | | | | | DDD | RDD |

In some embodiments, the last symbol in sTTI #5 may be used for SRS transmission.

Resource Configuration to Reduce Latency and Control Signaling Overhead

In an effort to reduce the latency and control signaling overhead, grant-free transmission is able to configure K resources within one period in an NR (or 5G) system; in an example, K is an integer no smaller than 2, e.g., K=2, 4, 8. The K resources correspond to one transmission block (TB) and a UE may transmit one redundant version (RV) of the TB on each resource. When the configured period is equal to or greater than 1 slot, two cases may be considered. One case (Case 1) is where the K resources are based on slot, e.g. the K resources are in different slots. The other case (Case 2) is where the K resources are based on a mini-slot, e.g. the K resources are in different mini-slots.

In the example of an NR system (also referred to as 5G), a slot may contain 14 symbols, and a mini-slot contains no more than 14 symbols, e.g., 2 or 4 or 7 symbols.

Figure 7:
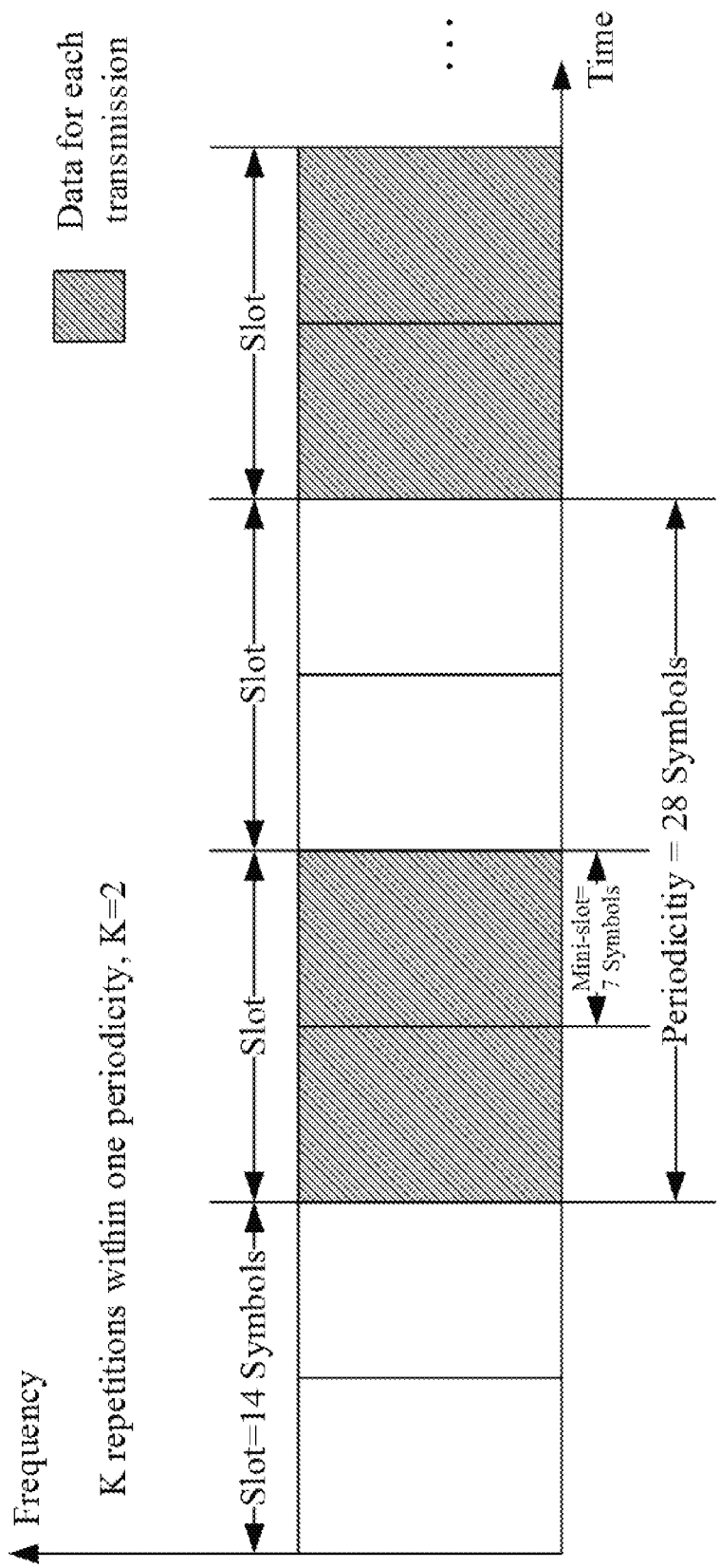
FIG. 7 shows an example of resource allocation to reduce latency and control signaling overhead.
Figure 8:
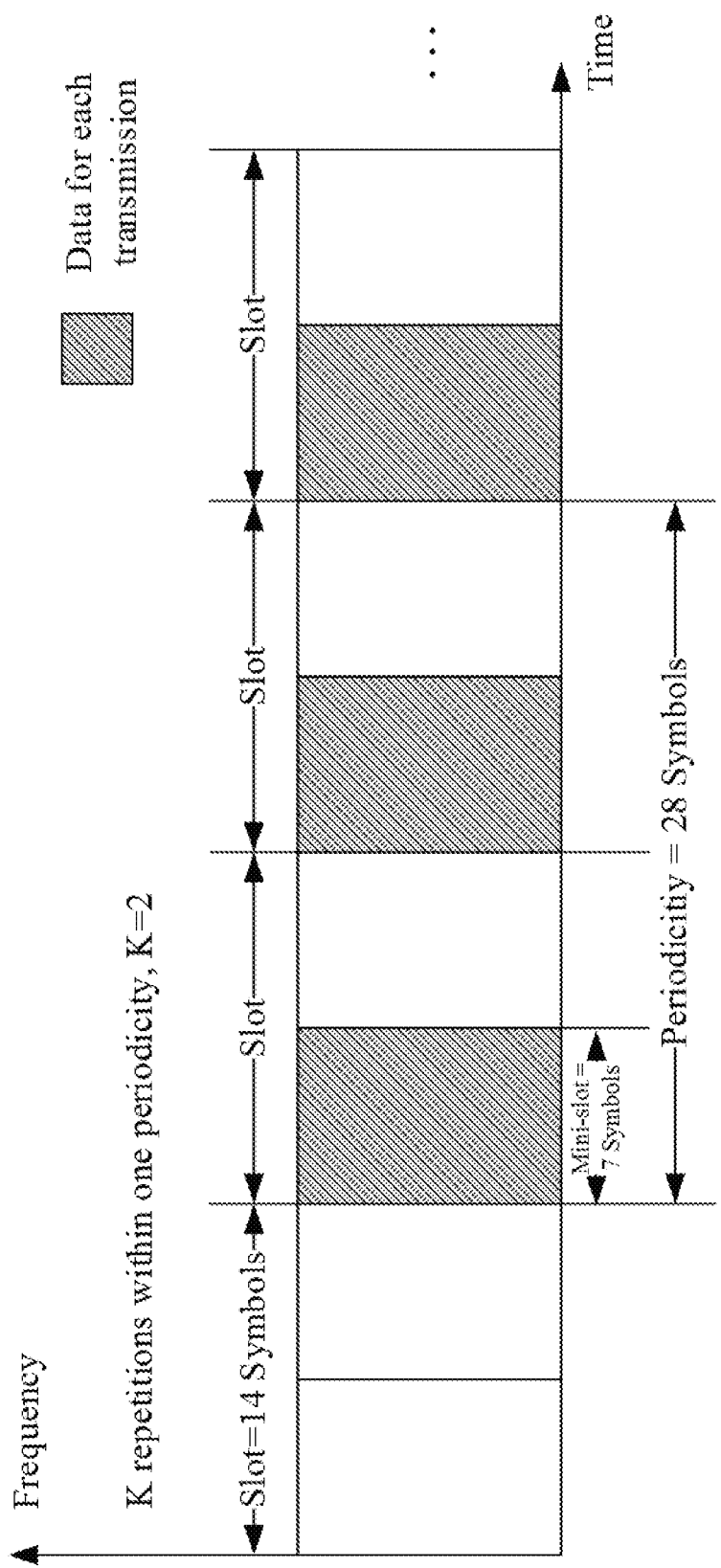
FIG. 8 shows another example of resource allocation to reduce latency and control signaling overhead.

For example, and as shown in FIGS. 7 and 8, the period may be 2 slots, K=2 and each resource has 7 symbols. FIG. 7 shows an exemplary resource allocation for Case 1, and FIG. 8 shows an exemplary resource allocation for Case 2.

In some scenarios, it may be necessary to determine whether a UE should transmit data based on Case 1 or Case 2 to achieve better flexibility without introducing additional signaling overhead.

In some embodiments, a UE may select either the Case 1 or Case 2 framework to transmit data based on a time domain offset (timeDomainOffset) field configured by RRC signaling. For example, the field may indicate the offset of a resource with respect to SFN=0 (e.g. the first resource within a period). In an example, the unit of the offset is a slot, in the range of 0~5119, which would require 13 bits to indicate.

In some embodiments, there is a one-to-one match between the value indicated by timeDomainOffset and the two cases. In some embodiments, when the value is smaller than a threshold D, the K resources are determined based on Case 1, otherwise the K resources are determined based on Case 2. In other embodiments, when the value is smaller than a threshold D, the K resources are determined based on Case 2, otherwise the K resources are determined based on Case 1.

In some embodiments, when the subcarrier spacing (SCS) of the configured resources is 15 kHZ, the threshold is a value between 639 and 5119, e.g., 640 or 2560. In some embodiments, when the SCS of the configured resources is 30 kHZ, the threshold is a value between 1279 and 5119, e.g., 1280 or 2560. In some embodiments, when the SCS of the configured resources is 60 kHZ, the threshold is a value between 2559 and 5119, e.g., 2560.

In an example, denote the value indicated by timeDomainOffset as X, and the offset of a resource with respect to SFN=0 as Y. In some embodiments, X mod C=Y, where C is a constant value related to the SCS. In some embodiments, C=640 in case of SCS is 15 kHZ, C=1280 in case of SCS is 30 kHZ, and C=2560 in case of SCS is 60 kHZ. In some embodiments, C=D and results in a simplified implementation. As described herein, the network and the UE may determine which one of the two cases to use without causing additional signaling overhead.

In some embodiments, a UE determines one of the two cases based on the SCS of the configured resources. In an example, the K resources are determined based on Case 1 when the SCS is equal to or greater than 120 kHZ, otherwise Case 2 is employed. In another example, the K resources are determined based on Case 2 when the SCS is equal to or greater than 120 kHZ, otherwise Case 1 is employed.

In some embodiments, a UE determines one of the two cases based on the number of symbols of each configured resource. In an example, the K resources are determined based on Case 1 when the number of symbols of each configured resource is less than 7, otherwise Case 2 is employed. In another example, the K resources are determined based on Case 2 when the number of symbols of each configured resource is less than 7, otherwise Case 1 is employed.

In some embodiments, a UE determines one of the two cases based on the value of K. In an example, the K resources are determined based on Case 1 in case K is less than a threshold E, otherwise Case 2 is employed. In another example, the K resources are determined based on Case 2 in case K is less than a threshold E, otherwise Case 1 is employed.

In some embodiments, a UE determines one of the two cases to use based on one or more of the aforementioned factors. For example, a combination of K and the number of symbols of each configured resource may be used to select either Case 1 or Case 2.

Figure 9:
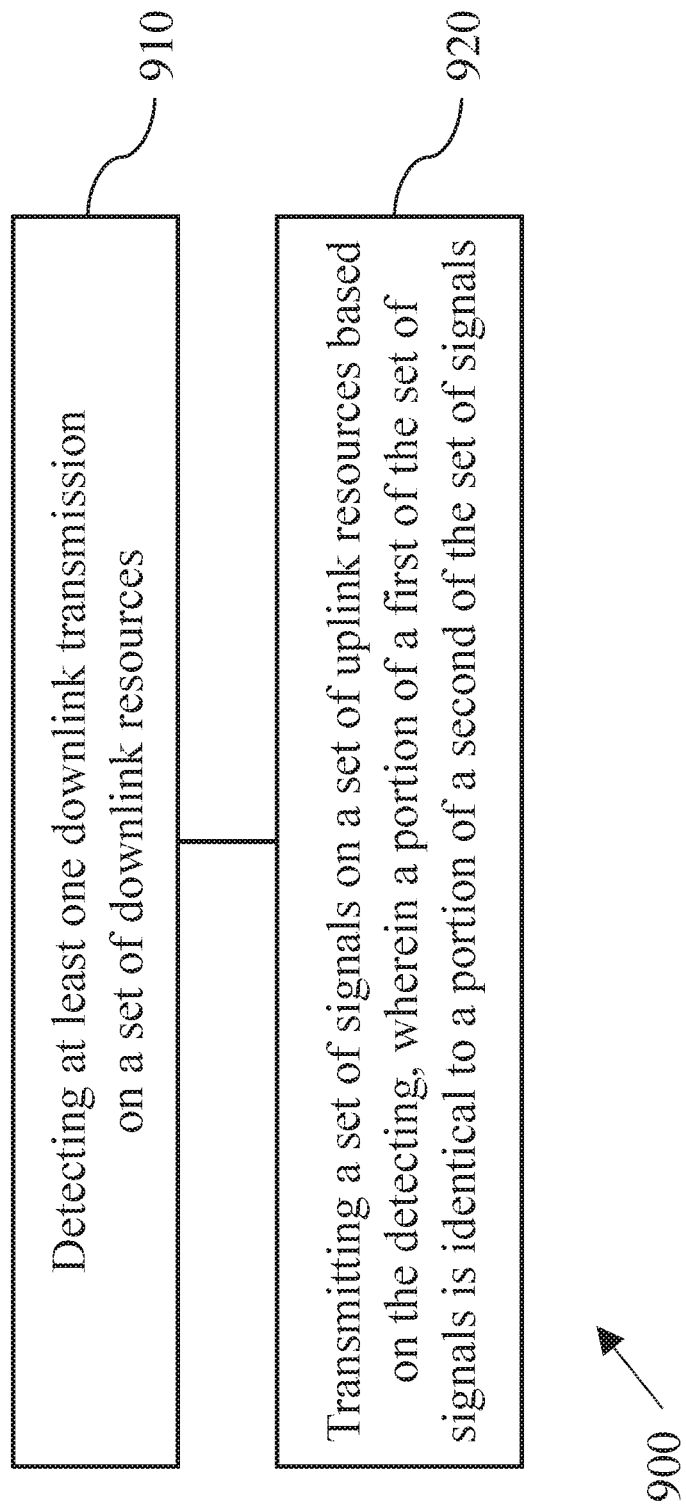
FIG. 9 shows an example of a wireless communication method for reliable information transmission.

FIG. 9 shows an example of a wireless communication method 900 for reliable information transmission. The method 900 includes, at step 910, detecting at least one downlink (DL) transmission on a set of downlink resources. In some embodiments, a DL transmission may be detected in each of the at least one DL resources. In other embodiments, a DL transmission may be detected in a subset of the at least one DL resources. In some embodiments, the set of downlink resources may be specified or predetermined by the network.

The method 900 includes, at step 920, transmitting a set of signals on a set of uplink resources based on the detecting, wherein the set of downlink resources is associated with the set of uplink resources, and wherein a portion of a first of the set of signals is identical to a portion of a second of the set of signals. In some embodiments, the portions of the first and second of the set of signals that are identical include the HARQ-ACK indication corresponding to a DL resource. Transmitting identical portions increase the reliability of the system.

Figure 10:
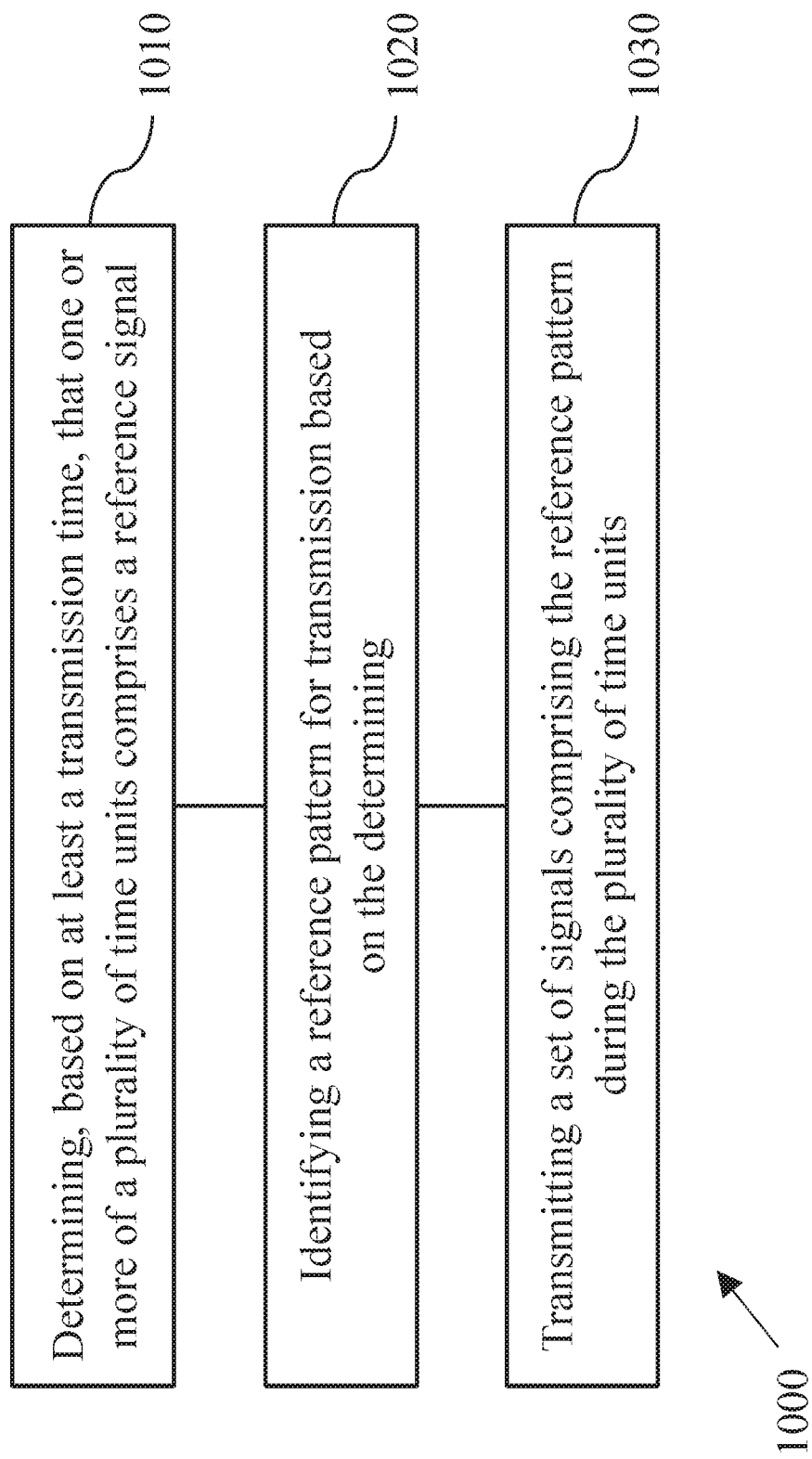
FIG. 10 shows another example of a wireless communication method for reliable information transmission.

FIG. 10 shows another example of a wireless communication method 800 for reliable information transmission. The method 1000 includes, at step 1010, determining, based on at least a transmission time, that one or more of a plurality of time units comprises a reference signal. In some embodiments, and as described in the context of the various examples in this patent document, the presence or absence of a reference signal in one or more of the plurality of time units is based on at least an index of a time unit and/or the transmission time with the plurality of time units. In an example, the transmission time may be an initial transmission time.

The method 1000 includes, at step 1020, identifying a reference pattern for transmission based on the determining.

In some embodiments, the identification may be based on a computation. In other embodiments, the identification may be based on a predetermined lookup table or specification. In yet other embodiments, the identification may be based on a repetition factor or a configuration provided by the network.

The method 1000 includes, at step 1030, transmitting a set of signals comprising the reference pattern during the plurality of time units. In some embodiments, transmission of the reference pattern may be across subframes.

Figure 11:
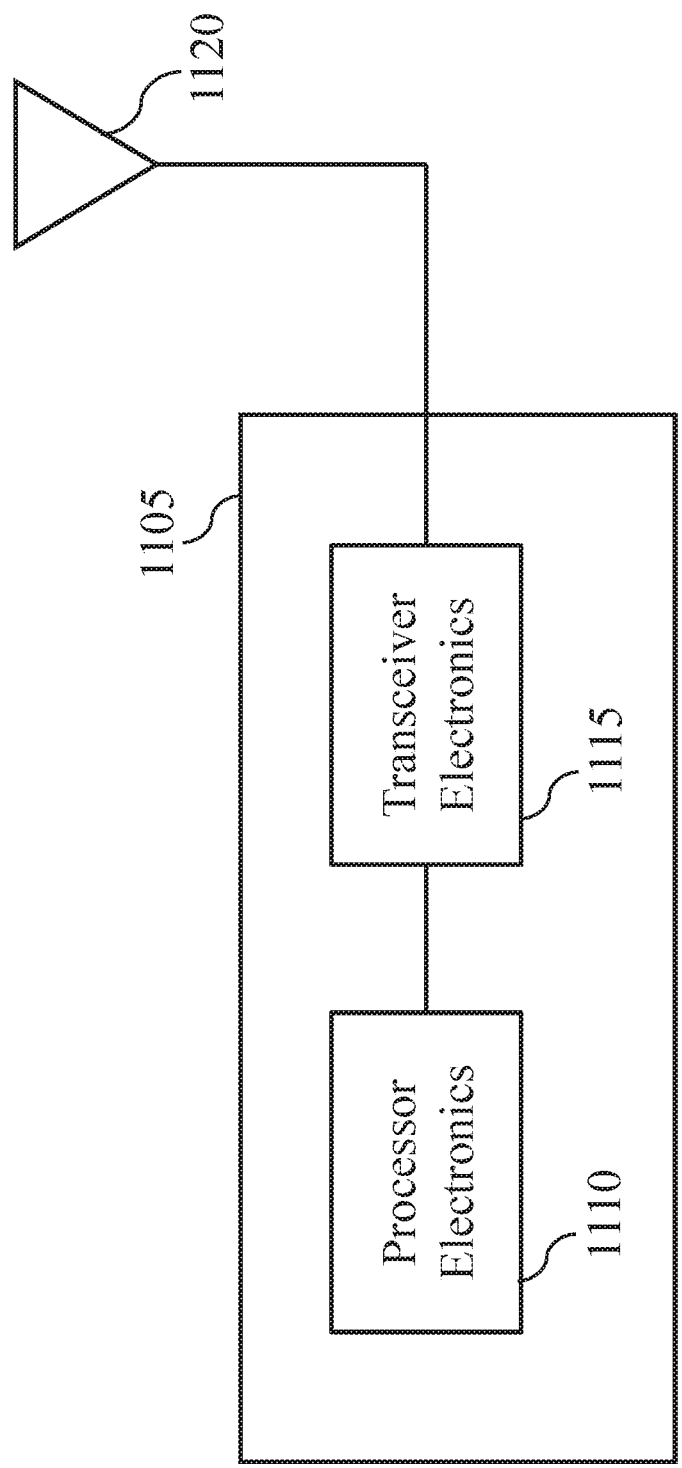
FIG. 11 is a block diagram representation of a portion of an apparatus that may implement a method or technique described in this patent document.

FIG. 11 is a block diagram of an example apparatus that may implement a method or technique described in this documents (e.g. methods 900 or 1000). A apparatus 1105, such as a base station or a wireless device (or UE), can include processor electronics 1110 such as a microprocessor that implements one or more of the techniques presented in this document. The apparatus 1105 can include transceiver electronics 1115 to send and/or receive wireless signals over one or more communication interfaces such as antenna(s) 1120. The apparatus 1105 can include other communication interfaces for transmitting and receiving data. Apparatus 1105 can include one or more memories (not explicitly shown) configured to store information such as data and/or instructions. In some implementations, the processor electronics 1110 can include at least a portion of the transceiver electronics 1115. In some embodiments, at least some of the disclosed techniques, modules or functions are implemented using the apparatus 1105.

It is intended that the specification, together with the drawings, be considered exemplary only, where exemplary means an example and, unless otherwise stated, does not imply an ideal or a preferred embodiment. As used herein, the singular forms "a", "an" and "the" are intended to include the plural forms as well, unless the context clearly indicates otherwise. Additionally, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
 detecting at least one downlink transmission on a set of downlink resources,
  wherein the set of downlink resources comprise one or more time units scheduled for physical downlink shared channel (PDSCH) transmissions, and wherein a set of uplink resources comprise two or more time units scheduled for physical uplink control channel (PUCCH) or physical uplink shared channel (PUSCH) transmissions, and
  wherein the detecting the at least one downlink transmission comprises:
   detecting the at least one downlink transmission in each of a first time unit, a second time unit and a third time unit of the one or more time units scheduled for the PDSCH transmissions; and
 transmitting a set of signals on a set of uplink resources based on the detecting,
  wherein the set of downlink resources is associated with the set of uplink resources,
  wherein a portion of a first of the set of signals is identical to a portion of a second of the set of signals,
  wherein the set of signals comprise one or more hybrid automatic repeat request (HARQ) acknowledgement (ACK) indications, and wherein at least one of the one of more HARQ-ACK indications comprises an acknowledgement (ACK) or a negative acknowledgement (NACK), and
  wherein the transmitting includes:
   transmitting a HARQ-ACK associated with the first time unit scheduled for the PDSCH transmissions and a HARQ-ACK associated with the second time unit scheduled for the PDSCH transmissions in a first of the two or more time units scheduled for the PUCCH or the PUSCH transmissions; and
   transmitting the HARQ-ACK associated with the second time unit and a HARQ-ACK associated with the third time unit scheduled for the PDSCH transmissions in a second of the two or more time units scheduled for the PUCCH or the PUSCH transmissions.

2. The method of claim 1, further comprising:
 transmitting a first HARQ-ACK indication in a first of the two or more time units scheduled for the PUCCH or the PUSCH transmissions.

3. The method of claim 2, further comprising:
 transmitting the first HARQ-ACK indication and a second HARQ-ACK indication in a second of the two or more time units scheduled for the PUCCH or the PUSCH transmissions.

4. The method of claim 3, wherein the detecting the at least one downlink transmission comprises:
 detecting the at least one downlink transmission in a first time unit and a second time unit of the one or more time units scheduled for PDSCH transmissions.

5. The method of claim 1, wherein the detecting the at least one downlink transmission comprises:
 detecting the at least one downlink transmission in a second time unit of the one or more time units scheduled for the PDSCH transmissions, wherein the at least one downlink transmission is not detected in a first time unit of the one or more time units scheduled for the PDSCH transmissions; and
 wherein the transmitting includes:
  transmitting a NACK indication associated with the first time unit scheduled for the PDSCH transmissions in a first of the two or more time units scheduled for the PUCCH or the PUSCH transmissions; and
  transmitting the NACK indication associated with the first time unit scheduled for the PDSCH transmissions and a HARQ-ACK indication associated with the second time unit scheduled for the PDSCH transmissions in a second of the two or more time units scheduled for the PUCCH or the PUSCH transmissions.

6. The method of claim 1, wherein the detecting the at least one downlink transmission comprises:
 detecting the at least one downlink transmission in a second time unit and a third time unit of the one or more time units scheduled for the PDSCH transmission, wherein the at least one downlink transmission is not detected in a first time unit of the one or more time units scheduled for the PDSCH transmissions; and
 wherein the transmitting includes:
  transmitting a NACK associated with the first time unit scheduled for the PDSCH transmissions and a HARQ-ACK associated with the second time unit scheduled for the PDSCH transmissions in a first of the two or more time units scheduled for the PUCCH or the PUSCH transmissions; and transmitting the HARQ-ACK associated with the second time unit and a HARQ-ACK associated with the third time unit scheduled for the PDSCH transmissions in a second of the two or more time units scheduled for the PUCCH or the PUSCH transmissions.

7. The method of claim 1, wherein the one or more time units or the two or more time units are selected from a transmission time interval (TTI), a shortened TTI (sTTI), a timeslot in a Long Term Evolution (LTE) Advanced system, or a timeslot in a New Radio (NR) system.

8. The method of claim 1, wherein the detecting the at least one downlink transmission comprises:
   detecting the at least one downlink transmission in a second time unit of the one or more time units scheduled for the PDSCH transmissions, wherein the at least one downlink transmission is not detected in a first time unit of the one or more time units scheduled for the PDSCH transmissions; and
   wherein the transmitting includes:
      transmitting a HARQ ACK indication associated with the second time unit scheduled for the PDSCH transmissions in one of the two or more time units scheduled for the PUCCH or the PUSCH transmissions; or
      transmitting a NACK indication associated with the first time unit scheduled for the PDSCH transmissions and the HARQ-ACK indication associated with the second time unit scheduled for the PDSCH transmissions in the one of the two or more time units scheduled for the PUCCH or the PUSCH transmissions.

9. An apparatus for wireless communication, comprising:
   a processor configured to:
   detect at least one downlink transmission on a set of downlink resources,
      wherein the set of downlink resources comprise one or more time units scheduled for physical downlink shared channel (PDSCH) transmissions, and wherein a set of uplink resources comprise two or more time units scheduled for physical uplink control channel (PUCCH) or physical uplink shared channel (PUSCH) transmissions, and
      wherein the detect the at least one downlink transmission is performed by the processor by being configured to:
         detect the at least one downlink transmission in each of a first time unit, a second time unit and a third time unit of the one or more time units scheduled for the PDSCH transmissions; and
   transmit a set of signals on a set of uplink resources based on the detecting,
      wherein the set of downlink resources is associated with the set of uplink resources,
      wherein a portion of a first of the set of signals is identical to a portion of a second of the set of signals,
      wherein the set of signals comprise one or more hybrid automatic repeat request (HARQ) acknowledgement (ACK) indications, and wherein at least one of the one of more HARQ-ACK indications comprises an acknowledgement (ACK) or a negative acknowledgement KNACK), and
      wherein the transmit the set of signals is performed by the processor by being configured to:
         transmit a HARQ-ACK associated with the first time unit scheduled for the PDSCH transmissions and a HARQ-ACK associated with the second time unit scheduled for the PDSCH transmissions in a first of the two or more time units scheduled for the PUCCH or the PUSCH transmissions; and
         transmit the HARQ-ACK associated with the second time unit and a HARQ-ACK associated with the third time unit scheduled for the PDSCH transmissions in a second of the two or more time units scheduled for the PUCCH or the PUSCH transmissions.

10. The apparatus of claim 9, wherein the processor is further configured to:
    transmit a first HARQ-ACK indication in a first of the two or more time units scheduled for the PUCCH or the PUSCH transmissions.

11. The apparatus of claim 10, wherein the processor is further configured to:
    transmit the first HARQ-ACK indication and a second HARQ-ACK indication in a second of the two or more time units scheduled for the PUCCH or the PUSCH transmissions.

12. The apparatus of claim 11, wherein the detect the at least one downlink transmission is performed by the processor by being configured to:
    detect the at least one downlink transmission in a first time unit and a second time unit of the one or more time units scheduled for PDSCH transmissions.

13. The apparatus of claim 9,
    wherein the detect the at least one downlink transmission is performed by the processor by being configured to:
        detect the at least one downlink transmission in a second time unit of the one or more time units scheduled for the PDSCH transmissions, wherein the at least one downlink transmission is not detected in a first time unit of the one or more time units scheduled for the PDSCH transmissions; and
    wherein the transmit the set of signals is performed by the processor by being configured to:
        transmit a NACK indication associated with the first time unit scheduled for the PDSCH transmissions in a first of the two or more time units scheduled for the PUCCH or the PUSCH transmissions; and
        transmit the NACK indication associated with the first time unit scheduled for the PDSCH transmissions and a HARQ-ACK indication associated with the second time unit scheduled for the PDSCH transmissions in a second of the two or more time units scheduled for the PUCCH or the PUSCH transmissions.

14. The apparatus of claim 9, wherein the detect the at least one downlink transmission is performed by the processor by being configured to:
    detect the at least one downlink transmission in a second time unit and a third time unit of the one or more time units scheduled for the PDSCH transmission, wherein the at least one downlink transmission is not detected in a first time unit of the one or more time units scheduled for the PDSCH transmissions; and
    wherein the transmit the set of signals is performed by the processor by being configured to:
        transmit a NACK associated with the first time unit scheduled for the PDSCH transmissions and a HARQ-ACK associated with the second time unit scheduled for the PDSCH transmissions in a first of the two or more time units scheduled for the PUCCH or the PUSCH transmissions; and
        transmit the HARQ-ACK associated with the second time unit and a HARQ-ACK associated with the third time unit scheduled for the PDSCH transmissions in a second of the two or more time units scheduled for the PUCCH or the PUSCH transmissions.

15. The apparatus of claim 9, wherein the one or more time units or the two or more time units are selected from a transmission time interval (TTI), a shortened TTI (sTTI), a timeslot in a Long Term Evolution (LTE) Advanced system, or a timeslot in a New Radio (NR) system.

16. The apparatus of claim 9,
wherein the detect the at least one downlink transmission is performed by the processor by being configured to:
detect the at least one downlink transmission in a second time unit of the one or more time units scheduled for the PDSCH transmissions, wherein the at least one downlink transmission is not detected in a first time unit of the one or more time units scheduled for the PDSCH transmissions; and
wherein the transmit the set of signals is performed by the processor by being configured to:
transmit a HARQ ACK indication associated with the second time unit scheduled for the PDSCH transmissions in one of the two or more time units scheduled for the PUCCH or the PUSCH transmissions; or
transmit a NACK indication associated with the first time unit scheduled for the PDSCH transmissions and the HARQ-ACK indication associated with the second time unit scheduled for the PDSCH transmissions in the one of the two or more time units scheduled for the PUCCH or the PUSCH transmissions.

17. A non-transitory computer readable program storage medium having code stored thereon, the code, when executed by a processor, causing the processor to implement a method:
detecting at least one downlink transmission on a set of downlink resources,
wherein the set of downlink resources comprise one or more time units scheduled for physical downlink shared channel (PDSCH) transmissions, and wherein a set of uplink resources comprise two or more time units scheduled for physical uplink control channel (PUCCH) or physical uplink shared channel (PUSCH) transmissions, and
wherein the detecting the at least one downlink transmission comprises:
detecting the at least one downlink transmission in each of a first time unit, a second time unit and a third time unit of the one or more time units scheduled for the PDSCH transmissions; and
transmitting a set of signals on a set of uplink resources based on the detecting,
wherein the set of downlink resources is associated with the set of uplink resources,
wherein a portion of a first of the set of signals is identical to a portion of a second of the set of signals,
wherein the set of signals comprise one or more hybrid automatic repeat request (HARD) acknowledgement (ACK) indications, and wherein at least one of the one of more HARQ-ACK indications comprises an acknowledgement (ACK) or a negative acknowledgement (NACK), and
wherein the transmitting includes:
transmitting a HARQ-ACK associated with the first time unit scheduled for the PDSCH transmissions and a HARQ-ACK associated with the second time unit scheduled for the PDSCH transmissions in a first of the two or more time units scheduled for the PUCCH or the PUSCH transmissions; and
transmitting the HARQ-ACK associated with the second time unit and a HARQ-ACK associated with the third time unit scheduled for the PDSCH transmissions in a second of the two or more time units scheduled for the PUCCH or the PUSCH transmissions.

18. The non-transitory computer readable program storage medium of claim 17, wherein the detecting the at least one downlink transmission comprises:
detecting the at least one downlink transmission in a second time unit of the one or more time units scheduled for the PDSCH transmissions, wherein the at least one downlink transmission is not detected in a first time unit of the one or more time units scheduled for the PDSCH transmissions; and
wherein the transmitting includes:
transmitting a NACK indication associated with the first time unit scheduled for the PDSCH transmissions in a first of the two or more time units scheduled for the PUCCH or the PUSCH transmissions; and
transmitting the NACK indication associated with the first time unit scheduled for the PDSCH transmissions and a HARQ-ACK indication associated with the second time unit scheduled for the PDSCH transmissions in a second of the two or more time units scheduled for the PUCCH or the PUSCH transmissions.

19. The non-transitory computer readable program storage medium of claim 17, wherein the detecting the at least one downlink transmission comprises:
detecting the at least one downlink transmission in a second time unit and a third time unit of the one or more time units scheduled for the PDSCH transmission, wherein the at least one downlink transmission is not detected in a first time unit of the one or more time units scheduled for the PDSCH transmissions; and
wherein the transmitting includes:
transmitting a NACK associated with the first time unit scheduled for the PDSCH transmissions and a HARQ-ACK associated with the second time unit scheduled for the PDSCH transmissions in a first of the two or more time units scheduled for the PUCCH or the PUSCH transmissions; and
transmitting the HARQ-ACK associated with the second time unit and a HARQ-ACK associated with the third time unit scheduled for the PDSCH transmissions in a second of the two or more time units scheduled for the PUCCH or the PUSCH transmissions.

20. The non-transitory computer readable program storage medium of claim 17, wherein the detecting the at least one downlink transmission comprises:
detecting the at least one downlink transmission in a second time unit of the one or more time units scheduled for the PDSCH transmissions, wherein the at least one downlink transmission is not detected in a first time unit of the one or more time units scheduled for the PDSCH transmissions; and
wherein the transmitting includes:
transmitting a HARQ ACK indication associated with the second time unit scheduled for the PDSCH transmissions in one of the two or more time units scheduled for the PUCCH or the PUSCH transmissions; or transmitting a NACK indication associated with the first time unit scheduled for the PDSCH transmissions and the HARQ-ACK indication associated with the second time unit scheduled for the PDSCH transmissions in the one of the two or more time units scheduled for the PUCCH or the PUSCH transmissions.

* * * * *

UNITED STATES PATENT AND TRADEMARK OFFICE
CERTIFICATE OF CORRECTION

PATENT NO. : 11,569,945 B2
APPLICATION NO. : 16/986055
DATED : January 31, 2023
INVENTOR(S) : Xianghui Han et al.

Page 1 of 1

It is certified that error appears in the above-identified patent and that said Letters Patent is hereby corrected as shown below:

In the Specification

In Column 8, Lines 30-31, delete "'It, D, R, D'" and insert -- 'R, D, R, D' --, therefor.

In the Claims

In Column 21, Line 62, in Claim 9, delete "KNACK)," and insert -- (NACK), --, therefor.

In Column 23, Line 59, in Claim 17, delete "(HARD)" and insert -- (HARQ) --, therefor.

Signed and Sealed this
Twenty-seventh Day of June, 2023

Katherine Kelly Vidal
*Director of the United States Patent and Trademark Office*